United States Patent [19]

Downing

[11] Patent Number: 4,706,409
[45] Date of Patent: Nov. 17, 1987

[54] CRAB POT CONSTRUCTION

[76] Inventor: Edgar W. Downing, P.O. Box 903, Bodega Bay, Calif. 94923

[21] Appl. No.: 872,273

[22] Filed: Jun. 9, 1986

[51] Int. Cl.$^4$ ............................................. A01K 69/08
[52] U.S. Cl. ....................................... 43/102; 43/100
[58] Field of Search ................. 43/100, 102, 103, 105; 220/19, 326

[56] References Cited

U.S. PATENT DOCUMENTS

| | | | |
|---|---|---|---|
| 92,939 | 7/1869 | Collier | 220/19 X |
| 832,284 | 10/1906 | White | 220/326 X |
| 895,124 | 8/1908 | Sundee | 220/326 |
| 1,003,540 | 9/1911 | Sterrett | 220/19 X |
| 1,447,502 | 3/1923 | Asanio et al. | 43/100 |
| 2,639,540 | 5/1953 | Buford | 43/102 |
| 3,699,702 | 10/1972 | Lankenau | 43/100 |

FOREIGN PATENT DOCUMENTS

| | | | |
|---|---|---|---|
| 210665 | 6/1909 | Fed. Rep. of Germany | 43/102 |
| 162866 | 4/1958 | Sweden | 43/102 |

OTHER PUBLICATIONS

World Fishing, Sep. 1967, pp. 37–38.

Primary Examiner—Nicholas P. Godici
Assistant Examiner—Carmine Cuda
Attorney, Agent, or Firm—Flehr, Hohbach, Test, Albritton & Herbert

[57] ABSTRACT

A crab pot of the type having a rigid frame with netting extending over the bottom, sides and top. The top side has a hinged lid portion which can be swung between closed and open position. It is retained in closed position by a manually released spring latch.

1 Claim, 4 Drawing Figures

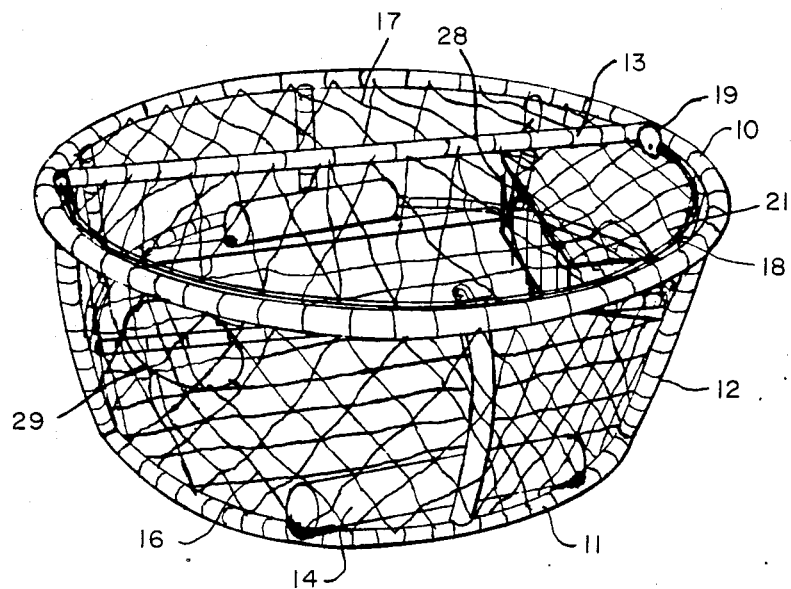
FIG.—1
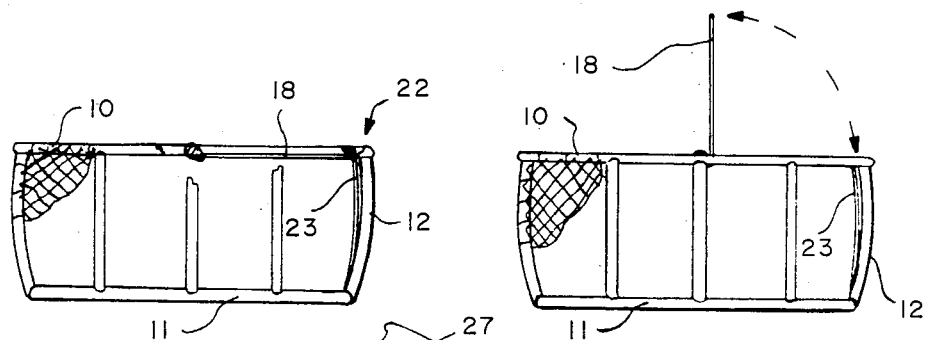
FIG.—2  FIG.—3
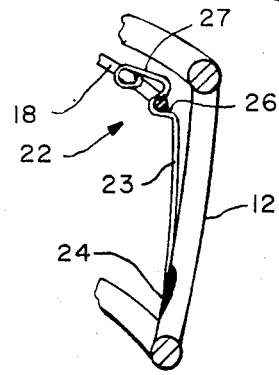
FIG.—4

4,706,409

CRAB POT CONSTRUCTION

This invention relates generally to crab pots such as are used by commercial fishermen.

Commercial crab fishermen make use of pots consisting of a rigid frame with netting over the bottom, sides and top. Access openings are provided for the crab to enter the pot, and exit openings may be provided for the escape of undersized crab. Means may be provided within the pot for holding suitable bait. A portion of the top of the pot is made to form a lid or closure that can be opened to permit access to the interior. One construction for this purpose consists of netting attached to a semi-circular rod or bar which has its ends connected to the sides of the frame, and which is held in closed position by the means of straps, which may be of elastic material. The free ends of the straps are provided with hooks of the snap-on type which are engaged with convenient portions of the netting to hold the semi-circular rod in closed position. Such crab pots are subject to serious difficulties, particularly since the straps may accidentally become entangled with the netting during opening of the pot. In addition they do not provide simple means for holding the lid in closed position, or for quickly and readily releasing the lid to obtain access to the interior of the pot. Elastic or rubber straps are subject to breakage and must be periodically replaced. Replacement during fishing and before baiting and dropping back into the ocean requires considerable lost fishing time.

In general it is an object of the present invention to provide a crab pot that is free of the above objections.

A further object of the invention is to provide a crab pot which has an improved means for retaining a lid forming a portion of the top of the pot in closed position.

In general the present invention consists of a rigid frame which serves to carry netting extending over the bottom, sides, and top of the frame. A portion of the netting extending over the top of the pot is attached to a semi-circular rod which has its ends connected to side portions of the frame by metal hinges. A spring latch is carried by an upright part of the frame and has its upper end formed to establish latching engagement with the semi-circular rod.

Additional objects and features of the invention will appear from the following description in which the preferred embodiment has been set forth in conjunction with the drawing.

REFERRING TO THE DRAWING

FIG. 1 is perspective view illustrating a crab pot incorporating the present invention.

FIG. 2 is a side view showing the frame on a reduced scale, together with the spring latch.

FIG. 3 is a side view like FIG. 2 but showing the semi-circular rod which engages the latch in open position.

FIG. 4 is a detail in perspective showing the construction of the latch.

SUMMARY OF THE INVENTION

The embodiment of the invention illustrated in the drawing consists of a relatively rigid metal frame comprising upper and lower circular members 10 and 11, together with a plurality of connecting upright members 12. In addition a cross-bar 13 extends diametrically across the upper member 10. Assuming that these members are made of metal which is corrodible, they may be coated with a suitable protective material which resists corrosion, such as a wrapping of synthetic or natural rubber. Corrosion is also inhibited by members 14 which are attached at their ends as by welding to the lower frame member 11, and which are made of suitable metal which by its presence tends to inhibit electrolytic corrosion of the other parts of the frame. Netting 16 extends across the bottom of the frame, and also about the sides. As indicated in the drawing the netting is secured to both the upper and lower frame members 10 and 11, and may also be secured to the upright members 12.

Netting 17 extends across about one half of the upper frame member 10, and as indicated, is attached to frame members 10 and the cross-bar 13. The other half of the top of the pot is constructed to provide a lid or closure which can be swung to open position to obtain access to the interior. More specifically, a rod or bar 18 is provided which is semi-circular, and which has its ends connected to the cross-bar 13 by metal hinges 19. The radius to which the rod 18 is formed, is preferably shorter than the radius of the member 10, thus providing a space between these parts. Netting 21 is attached to the rod 18 and to the cross-bar 13 to form a closure or lid.

A spring latch 22 is provided to retain the rod 18 and its associated netting in closed position. A suitable latch construction is illustrated in FIG. 4. It consists of a rod 23 or heavy wire, made of spring metal, which has its lower end secured as by welding 24 to an adjacent upright 12. The upper end of the rod is bent to provide the latching recess 26, and an extended portion 27 for manual engagement. The recess faces the adjacent portion of the upper frame member 10. FIG. 4 shows the semi-circular rod 18 engaged within the latching recess 26. It will be evident that the rod 18 can be readily released by manually swinging the portion 27 toward the left, as illustrated in FIG. 4, which then permits the rod 18 and its associated netting to be swung upwardly to permit access to the interior of the pot.

As is customary the pot is provided with one or more openings 28 for the entrance of crabs. Other smaller exit openings 29 may be provided for the escape of undersized crabs. The interior of the pot may also be provided with means for holding bait.

It will be evident that the present invention greatly facilitates the work of commercial fishermen, particularly in that it avoids the difficulties encountered with prior crab pots making use of straps for holding an upper lid in closed position. The spring latch avoids entanglements with the netting, it is positive in its holding action, and it is readily disengaged for access to the interior of the pot.

What is claimed is:

1. In a crab pot construction, upper and lower circular frame members, a plurality of upright frame members connected to and disposed between said upper and lower frame members so that the upper and lower frame members are in a vertically spaced generally parallel relationship, a cross frame member extending across the upper member and secured thereto, means forming a closure which includes a substantially semi-circular rod hingedly mounted on said cross frame member and being adapted to extend over the space between the cross frame member and one side of the upper frame member, yieldable spring latch means carried by at least one of the upright members and adapted to engage the rod to hold the rod in a position which is generally planar to the plane in which the upper frame member lies to provide an openable closure for the crab pot for access to the interior of the crab pot, said yieldable spring latch means being comprised of an elongated spring-like member secured at its lower end to one of the upright frame members and extending vertically upwardly from the secured lower end, said spring latch means having a notch formed near its upper end disposed interiorally of the upper circular frame member and facing in a direction exteriorally of the upper frame member, said notch being adapted to receive said semi-circular rod to retain said closure in a closed position, means carried by the yieldable spring latch means adapted to be engaged by the hand whereby the spring latch means can be moved to release said semi-circular rod to permit said closure to be swung upwardly to an open position and netting extending over the upper and lower circular members and the upright members and the closure.

* * * * *